United States Patent Office 3,471,495
Patented Oct. 7, 1969

---

3,471,495
6-OXYGENATED-3,4-DIAZA-Δ⁴-ANDROSTENES
Seymour D. Levine, North Brunswick, and Pacifico A. Principe, South River, N.J., assignors to E. R. Squibb & Sons, Inc., New York, N.Y., a corporation of Delaware
No Drawing. Filed May 17, 1968, Ser. No. 729,942
Int. Cl. C07d 101/00
U.S. Cl. 260—250     8 Claims

ABSTRACT OF THE DISCLOSURE

6 - oxygenated-2-keto-3,4-diaza-Δ⁴-androstenes are prepared by subjecting a 2-keto-3,4-diaza-Δ⁴-androstene to the action of enzymes of the microorganism *Colletotrichum linicola* to yield the corresponding 6β-hydroxy derivative, which can then, if desired, be acylated to yield the corresponding 6-ester or oxidized to yield the corresponding 6-keto. The new product sformed possess antiandrogenic activity.

---

This invention relates to new steroidal compounds and, more particularly, to new steroids of the 6-oxygenated 3,4-diaza-Δ⁴-androstene series, and processes for preparing the same.

The new final products of this invention are of the Formula I:

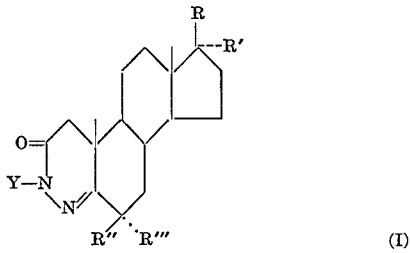

(I)

wherein Y is lower alkyl, aryl, aryl(lower alkyl), halo-lower alkyl, haloaryl, haloaryl(lower alkyl), or trifluoromethylaryl; R and R″ is hydroxy or acyloxy; R′ is hydrogen, lower alkyl, vinyl, ethynyl, halovinyl, haloethynyl or trifluoromethyl-ethynyl; R‴ is hydrogen; or together R and R′ and R″ and R‴ are each oxo (O=).

Among the suitable values for Y may be mentioned lower alkyl (e.g., methyl, ethyl, n-butyl and in-hexyl); aryl (e.g., phenyl, naphthyl, o, m, and p-tolyl and the xylyls); aryl(lower alkyl) (e.g., benzyl, phenethyl and β-phenylpropyl); halo substituted lower alkyl (e.g., 2-chloroethyl and 2,3-difluoroethyl and 2,2,2-trifluoroethyl); halo substituted aryl (e,g., o-chlorophenyl, p-fluorophenyl and o,p-dibromophenyl); halo-substituted aryl(lower alkyl) (e.g., p-chlorobenzyl and o-iodophenethyl); and trifluoromethylaryl (e.g., p-trifluoromethylphenyl). Among the suitable acyloxys may be mentioned the acyloxy radical of a hydrocarbon carboxylic acid of less than twelve carbon atoms, as exemplified by the lower alkanoic acids (e.g., acetic, propionic, butyric, hexanoic and enanthic acid), the lower alkenoic acids, the cycloalkane carboxylic acids, the cycoalkene carboxylic acids, the monocyclic aromatic carboxylic acids (e.g., benzoic acid), and the monocyclic aryl(lower alkanoic) acids (e.g., phenacetic and β-phenylpropionic acid). Among the suitable halogen substituted vinyls may be mentioned perhalovinyls, such as trifluorovinyl, trichlorovinyl, 1,2-difluoro-2-chlorovinyl and 1,2-difluoro-2-bromovinyl; the dihalovinyls, such as 1,2-difluorovinyl, 2,2-difluorovinyl, 1-chloro-2-fluorovinyl, 1-chloro-2-fluorovinyl, 1-bromo-2-fluorovinyl, and 1,2-dichlorovinyl; and the monohalovinyls, such as 1 - fluoro-vinyl, 2-fluorovinyl, 1-chlorovinyl, 2-chlorovinyl and 1-bromovinyl. Among the suitable halogen substituted ethynyls may be mentioned fluoroethynyl, chloroethynyl and bromoethynyl.

The compounds of the instant invention are physiologically active steroids which possess antiandrogenic activity, i.e., they inhibit the action of androgens, and they may be used in the treatment of such conditions as hyperandrogenic acne. The compounds may be formulated for such administration, the concentration and/or dosage being based on the activity of the particular compound.

In addition, the compounds of this invention are surface active agents which may therefore be employed in a variety of applications requiring such an agent. For example, the compounds of this invention may be employed as emulsifying agents in the preparation of lubricants, adhesives, polishes, wax compositions, and the like. Further, these compounds are ultraviolet-absorbing materials and may be employed as sun-screening agents. They may also be employed as antioxidants and corrosion inhibitors for various hydrocarbons and mixtures thereof. As example of materials to which the compounds of this invention may be added for this purpose may be mentioned gasoline, hydrocarbon lubrication oils and greases, hydrocarbon solvents (e.g., toluene, kerosene) and the like.

To prepare the compounds of this invention, a compound having the Formula II:

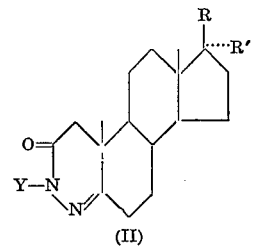

(II)

wherein Y, R and R′ are as hereinbefore defined, is subjected to the action of enzymes of the microorganism *Colletotrichum linicola*, the reaction being carried out in the usual manner by culturing the microorganism in the presence of the steroid, or by treating the steroid with non-proliferating cells of the microorganism, or by intermixing the steroid with the hydroxylating enzymes previously obtained from the microorganism. The conditions for such microbial reaction are well known in the art and are similar to those specified in U.S. Patent 3,179,698.

The starting steroids of the Formula II can be prepared by the method disclosed in U.S. patent application, Ser. No. 492,320, filed Oct. 1, 1965. This method entails reacting 3-oxa-A-norandrostane-5β,17β-diol-2-one with a hydrazine of the formula Y—NH—NH₂, wherein Y is as hereinbefore defined, to yield those compounds of Formula II wherein R is hydroxy and R′ is hydrogen. The 17β-hydroxy compounds can then be acylated by treating with an acyl chloride or acid anhydride of one of the acids specifically mentioned hereinbefore in the presence of an organic base, such as pyridine, to yield those compounds wherein R is acyloxy; or oxidized, as by treating with chromium trioxide, to yield those compounds of Formula II wherein R and R′ is oxo. The 17-keto compounds can then be treated with a Grignard, such as a lower alkyl magnesium iodide, to yield those compounds of Formula II wherein R′ is lower alkyl and R is hydroxy, or with a R′ substituted lithium to yield those compounds of Formula II wherein R′ is vinyl, ethynyl, halovinyl, haloethynyl or trifluoromethylethynyl and R is hydroxy. These R′-substituted compounds can then be esterified by treatment with an acyl chloride or acid anhydride in the presence of perchloric acid to yield those compounds of Formula II wherein R′ is other than hydrogen, and R is acyloxy.

The microbial hydroxylation with *Colletotrichum linicola* yields those final products of Formula I wherein R″ is hydroxy and R‴ is hydrogen (i.e., the 6β-hydroxy compounds). These compounds can then be esterified by treating with an acyl chloride or acid anhydride of one of the acids specifically mentioned hereinbefore in the presence of an organic base, such as pyridine, to yield those compounds wherein R and R″ are acyloxy; or oxidized, as by treating with chromium trioxide, to yield those compounds of Formula I wherein R″ and R‴ are oxo. This oxidation will also oxidize the 17-hydroxy group, if R′ is hydrogen, to a 17-keto group, thereby yielding the 2,6,17-triketo compound.

The following examples illustrate the invention (all temperatures being in centigrade):

EXAMPLE 1.—3-N-METHYL-3,4-DIAZA-6β,17β-DIHYDROXYANDROST-4-EN-2-ONE

(A) Fermentation

Surface growth from each of 2 two-week-old agar slants of *Colletotrichum linicola* (NCTC–1194), (National Collection Type Culture, London, England), the slants containing as a nutrient medium (A):

|  | Grams |
|---|---|
| Glucose | 10 |
| Yeast extract | 2.5 |
| $K_2HPO_4$ | 1 |
| Agar | 20 |
| Distilled water to one liter. | | is suspended in 5 ml. of 0.01% aqueous sodium lauryl sulfate solution. One ml. portions of this suspension are used to inoculate eight 250 ml. Erlenmeyer flasks, each containing 50 ml. of the following sterilized medium (B):

|  | Grams |
|---|---|
| Cornsteep liquor | 6 |
| $NH_4H_2PO_4$ | 3 |
| Yeast extract | 2.5 |
| Dextrose | 10 |
| $CaCO_3$ | 2.5 |
| Distilled water to one liter. | |

After 72 hours' incubation at 25° with continuous rotary agitation (280 cycles/minute; two-inch stroke), 10% (vol./vol.) transfers are made to thirty-four 250 ml. Erlenmeyer flasks each containing 50 ml. of freshly sterilized medium (B). Steroid (300 micrograms/ml.) is then added by supplementing each flask with 0.25 ml. of a sterile solution (60 mg./ml.) of 3-N-methyl-3,4-diaza-17β-hydroxyandrost-4-en-2-one in N,N-dimethylformamide. A total of 510 mg. is fermented.

After approximately 30 hours of further incubation using identical conditions as described above, the contents of the flasks are pooled and the broth is then filtered through a Seitz clarifying pad. The flasks, mycelium and pad are washed with successive 100 ml. portions of warm water. The combined filtrate and washings have a volume of 1900 ml.

(B) Isolation

The thus obtained filtrate is extracted with chloroform three times. The chloroform extracts are washed three times with water, dried over sodium sulfate and evaporated to dryness. The residue is crystallized from methanol-isopropyl ether to give about 312 mg. of 3-N-methyl-3,4-diaza-6β,17β-dihydroxyandrost-4-en-2-one, M.P. about 263.5–265.5(d.). The analytical sample is prepared by recrystallization from methanol-isopropyl ether, M.P. about 267.5–268.5(d.); $[\alpha]^D_{24} + 1°$ (EtOH);

$\lambda$ KBr 2.86, 3.01, 6.10 and 6.23μ; $\lambda$ EtOH 252 mμ (7550); $\tau^{TMS}_{CDCl_3}$ 9.17 (s., 18-Me), 8.80 (s., 19-Me), 6.62 (s., 3-N-Me), 6.32 (m., 17α-H), and 5.52 (m., 6α-H).

*Analysis.*—Calcd. for $C_{18}H_{28}O_3N_2$ (320.42): C, 67.47; H, 8.81; N, 8.74. Found: C, 67.28; H, 8.60; N, 8.68.

Similarly, by following the procedure of Example 1, but substituting 500 mg. of the indicated 3-N-Y-3,4-diaza-17β-hydroxyandrost-4-en-2-one reactant for the 3-N-methyl-3,4-diaza-17β-hydroxyandrost-4-en-2-one used in the example, the designated 3-N-Y-3,4-diaza-6β,17β-dihydroxyandrost-4-en-2-one product is formed:

| Example | Reactant (Y is) | Product (Y is) |
|---|---|---|
| 2 | Phenyl | Phenyl. |
| 3 | p-Fluorophenyl | p-Fluorophenyl. |
| 4 | Ethyl | Ethyl. |
| 5 | n-Hexyl | n-Hexyl. |
| 6 | Naphthyl | Naphthyl. |
| 7 | p-Tolyl | p-Tolyl. |
| 8 | Benzyl | Benzyl. |
| 9 | 2-chloroethyl | 2-chloroethyl. |
| 10 | 2,2,2-trifluoroethyl | 2,2,2-trifluoroethyl. |
| 11 | o,p-Dibromophenyl | o,p-Dibromophenyl. |
| 12 | p-Chlorobenzyl | p-Chlorobenzyl. |
| 13 | p-Trifluoromethylphenyl | p-Trifluoromethylphenyl. |

EXAMPLE 14.—3,17α-DIMETHYL-3,4-DIAZA-6β,17β-DIHYDROXYANDROST-4-EN-2-ONE

(a) Preparation of 3,17α-dimethyl-3,4-diaza-17β-hydroxyandrost-4-en-2-one

A solution of 50 mg. of 3-N-methyl-3,4-diaza-17β-hydroxyandrost-4-en-2-one in 10 ml. of acetone is treated dropwise with an equivalent amount of chromium trioxide-sulfuric acid. The chromic sulfate is removed by filtration and washed with additional acetone. The filtrate is concentrated, diluted with water and extracted with chloroform. The chloroform extracts are washed with 8% salt solution, dried over sodium sulfate and evaporated to dryness to give 3-methyl-3,4-diaza-androst-4-ene-2,17-dione.

A solution of 150 mg. of 3-methyl-3,4-diaza-androst-4-ene-2,17-dione in 20 ml. of tetrahydrofuran is treated with a five-fold excess of methyl magnesium iodide in 20 ml. of ether and refluxed for 5 hours. The reaction mixture is treated with a saturated ammonium chloride solution and the organic layer separated. The organic layer is washed with 8% salt solution, dried over sodium sulfate and evaporated to give 3,17α-dimethyl-3,4-diaza-17β-hydroxyandrost-4-en-2-one.

(b) Preparation of 3,17α-dimethyl-3,4-diaza-6β,17β-dihydroxyandrost-4-en-2-one Following the procedure of Example 1, but substituting 550 mg. of 3,17α-dimethyl-3,4-diaza-17β-hydroxyandrost-4-en-2-one for the 3-methyl-3,4-diaza-17β-hydroxyandrost-4-en-2-one, there is obtained 3,17α-dimethyl-3,4-diaza-6β,17β-dihydroxyandrost-4-en-2-one.

Similarly, by following the procedure of Example 14, but substituting the indicated 3-Y substituted-3,4-diaza-17β-hydroxyandrost-4-en-2-one for the 3-N-methyl-3,4-diaza-17β-hydroxyandrost-4-en-2-one in step (a) of the example, the indicated A-Y substituted-17α-methyl-3,4-diaza-6β,17β-dihydroxyandrost-4-en-2-one is formed.

| Example | Reactant (Y is) | Product (Y is) |
|---|---|---|
| 15 | p-Fluorophenyl | p-Fluorophenyl. |
| 16 | Phenyl | Phenyl. |
| 17 | Ethyl | Ethyl. |
| 18 | n-Hexyl | n-Hexyl. |
| 19 | Naphthyl | Naphthyl. |
| 20 | p-Tolyl | p-Tolyl. |
| 21 | Benzyl | Benzyl. |
| 22 | 2-chloroethyl | 2-chloroethyl. |
| 23 | 2,2,2-trifluoroethyl | 2,2,2-trifluoroethyl. |
| 24 | o,p-Dibromophenyl | o,p-Dibromophenyl. |
| 25 | p-Chlorobenzyl | p-Chlorobenzyl. |
| 26 | p-Trifluoromethylphenyl | p-Trifluoromethylphenyl. |

Similarly, by following the procedure of Example 14, but substituting the indicated R′-lithium for the methyl magnesium iodide, the indicated 3-methyl-17α-R′ substituted-3,4-diaza-6β,17β-dihydroxyandrost-4-en-2-one is formed:

| Example | Reactant (R' is) | Product (R' is) |
|---|---|---|
| 27 | Ethynyl | Ethynyl. |
| 28 | Vinyl | Vinyl. |
| 29 | Trifluorovinyl | Trifluorovinyl. |
| 30 | 1-chloro-2-fluorovinyl | 1-chloro-2-fluorovinyl. |
| 31 | 1-fluorovinyl | 1-fluorovinyl. |
| 32 | Trifluoromethylethynyl | Trifluoromethylethynyl. |

EXAMPLE 33.—3-N-METHYL-3,4-DIAZA-6β,17β-DIACETOXYANDROST-4-EN-2-ONE

A solution of 50 mg. of 3-N-methyl-3,4-diaza-6β,17β-dihydroxyandrost-4-en-2-one in 0.25 ml. of acetic anhydride and 0.50 ml. of pyridine is warmed on a steam bath for 2 hours. The solution is diluted with water, and extracted with chloroform. The chloroform extracts are washed with 8% salt solution, dried over sodium sulfate and evaporated to dryness. Plate chromatography of the residue on neutral alumina using chloroform as the developing solvent, and detection of the major band by ultraviolet light, gives after elution with ethyl acetate, about 14 mg. of 3-N-methyl-3,4,diaza-6β,17β-diacetoxyandrost-4-en-2-one;

$\tau^{TMS}_{CDCl_3}$ 9.14 (s., 18-Me), 8.86 (s., 19-Me), 6.62 (s,. 3-N-Me), 5.52 (m., 17α-H) and 4.42 (m., 6α-H).

Similarly, by following the procedure of Example 33, but substituting the indicated 3-Y substituted-3,4-diaza-6β,17β-dihydroxyandrost-4-en-2-one for the steroid reactant, the designated 3-Y substituted-3,4-diaza-6β,17β-diacetoxyandrost-4-ene-2-one is formed:

| Example | Reactant (Y is) | Product (Y is) |
|---|---|---|
| 34 | p-Fluorophenyl | p-Fluorophenyl. |
| 35 | Phenyl | Phenyl. |
| 36 | Ethyl | Ethyl. |
| 37 | n-Hexyl | n-Hexyl. |
| 38 | p-Tolyl | p-Tolyl. |
| 39 | Naphthyl | Naphthyl. |
| 40 | Benzyl | Benzyl. |
| 41 | 2-chloroethyl | 2-chloroethyl. |
| 42 | 2,2,2-trifluoroethyl | 2,2,2-trifluoroethyl. |
| 43 | o,p-Dibromophenyl | o,p-Dibromophenyl. |
| 44 | p-Chlorobenzyl | p-Chlorobenzyl. |
| 45 | p-Trifluoromethylphenyl | p-Trifluoromethylphenyl. |

Similarly, by following the procedure of Example 33, but substituting an acyl chloride or acid anhydride of one of the acids specifically mentioned hereinbefore for the acetic anhydride in the example, the corresponding 6β,17β-diester is formed.

EXAMPLE 46.—3-N-METHYL-3,4-DIAZA-ANDROST-4-EN-2,6,17-TRIONE

A solution of 73 mg. of 3-N-methyl-3,4-diaza-6β,17β-dihydroxyandrost-4-en-2-one in 30 ml. of acetone is treated with a slight excess of chromium trioxide-sulfuric acid and stirred at room temperature for 5 minutes. Methanol is added to decompose excess, and the suspension is passed through Hy-Flo. The filtrate is concentrated, diluted with water and extracted with chloroform. The chloroform extracts are washed with 8% salt solution, dried over sodium sulfate and evaporated. The residue is plate chromatographed on silica gel using ethyl acetate-chloroform (2:1) as the developing solvent, and the major band detected with ultraviolet light. Elution with ethyl acetate and crystallization from acetone-isopropyl ether gives about 20 mg. of 3-N-methyl-3,4-diaza-androst-4-en-2,6,17-trione, M.P. about 239–241° (d.);

$\lambda^{MeOH}_{max.}$ 295 mμ; $\tau^{TMS}_{CDCl_3}$ 9.06 (s., 18-Me), 8.87 (s., 19-Me), and 6.49 (s., 3-N-Me).

Similarly, by substituting the indicated 3-Y-3,4-diaza-6β,17β-dihydroxyandrost-4-en-2-one for the 3-N-methyl-3,4-diaza-6β,17β-dihydroxyandrost-4-en-2-one in the procedure of Example 46, the designated 3-Y-3,4-diaza-androst-4-en-2,6,17-trione is formed:

| Example | Reactant (Y is) | Product (Y is) |
|---|---|---|
| 47 | p-Fluorophenyl | p-Fluorophenyl. |
| 48 | Phenyl | Phenyl. |
| 49 | Ethyl | Ethyl. |
| 50 | n-Hexyl | n-Hexyl. |
| 51 | Naphthyl | Naphthyl. |
| 52 | p-Tolyl | p-Tolyl. |
| 53 | Benzyl | Benzyl. |
| 54 | 2-chloroethyl | 2-chloroethyl. |
| 55 | 2,2,2-trifluoroethyl | 2,2,2-trifluoroethyl. |
| 56 | o,p-Dibromophenyl | o,p-Dibromophenyl. |
| 57 | p-Chlorobenzyl | p-Chlorobenzyl. |
| 58 | p-Trifluoromethylphenyl | p-Trifluoromethylphenyl. |

What is claimed is:
1. A compound of the formula

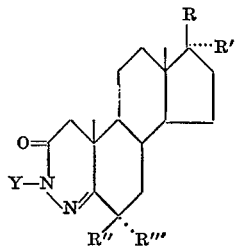

wherein Y is selected from the group consisting of lower alkyl, halo-lower alkyl, Z and Z(lower alkyl), wherein Z is selected from the group consisting of naphthyl, phenyl, mono and di(lower alkyl)phenyl, mono and dihalophenyl, and trifluoromethylphenyl; R and R" is each selected from the group consisting of hydroxy and the acyloxy radical of a hydrocarbon carboxylic acid of less than twelve carbon atoms; R' is selected from the group consisting of hydrogen, lower alkyl, vinyl, ethynyl, halovinyl, haloethynyl and trifluoromethylethynyl, R''' is hydrogen; or together R and R' and R" and R''' are oxo.

2. The compounds of claim 1, wherein Y is lower alkyl.

3. The compounds of claim 1, wherein Y is methyl.

4. The compounds of claim 1, wherein R and R" are hydroxy and R' and R''' are hydrogen.

5. The compounds of claim 1, wherein together R and R' and R" and R''' are oxo.

6. The compound of claim 1, wherein Y is methyl, R and R" are hydroxy and R' and R''' are hydrogen.

7. The compound of claim 1, wherein Y is methyl, and together R and R' and R" and R''' are oxo.

8. The compound of claim 1, wherein Y is methyl, R and R" are acetoxy and R' and R''' are hydrogen.

References Cited

Caspi et al., Chemistry and Industry, pages 1495–1496, Sept. 7, 1963.

NICHOLAS S. RIZZO, Primary Examiner

U.S. Cl. X.R.
260—999